UNITED STATES PATENT OFFICE.

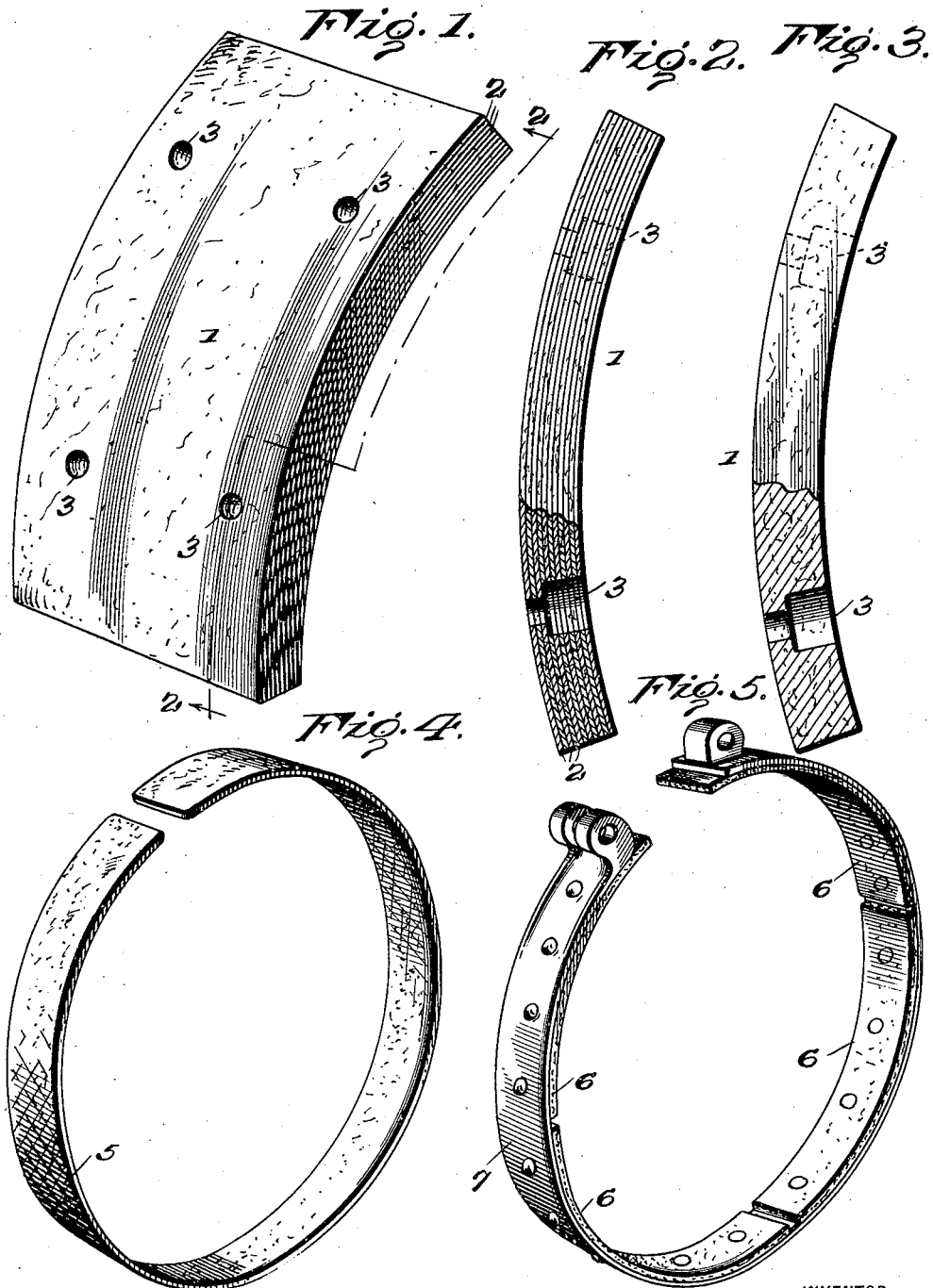

WILLIAM ACHTMEYER, OF MIDDLETOWN, CONNECTICUT.

FRICTION COMPOSITION AND PROCESS OF MAKING SAME.

1,418,607.  Specification of Letters Patent.  Patented June 6, 1922.

Application filed March 10, 1921. Serial No. 451,343.

*To all whom it may concern:*

Be it known that I, WILLIAM ACHTMEYER, a citizen of the United States, and a resident of Middletown, in the county of Middlesex and State of Connecticut, have made certain new and useful Improvements in a Friction Composition and Process of Making Same, of which the following is a specification.

My invention relates to friction devices such as brake-shoes and linings, and the object thereof is the provision of brake-shoes or like devices which possess a high coefficient of friction, and a smooth gradually increasing action and which have a high temperature of carbonization and which are unaffected by water, oil and heat, and which will withstand heavy abrasive wearing strains.

The known brake linings in shoes which generally are made from asbestos webbing impregnated with some bituminous or gummy substance associated with oils, tars, waxes, etc., become soft and sticky due to the heat developed by friction. Oils soften the linings and make them slippery, and on account of their porosity the linings absorb water and oil. Asbestos fiber on account of its brittleness cannot be spun into yarn or be woven into webbing without mixing therewith, at least 25% of cotton fiber. The heat developed by the friction destroys the cotton fiber and also burns or carbonizes the impregnating compounds generally used, so that the shoe lining made thereof is destroyed in a short time.

I have found that the anhydrous liquid reaction product of phenol and formaldehyde as described in my application Serial No. 451,342, or the friction compound of phenol and methylene-diphenyl-diamine, as described in my application Serial No. 451,345, compounded with asbestos fiber or used to impregnate asbestos, yields a mass possessing novel characteristic qualities and presents marked advantages over brake-shoes and linings previously known. Advantages result from the physical and chemical characteristics of the composition as well as from the simplified and inexpensive manufacture of these products.

My brake linings or shoes may be prepared as follows: Compact and dense sheets made entirely of asbestos are immersed in one of my above mentioned reaction compounds, preferably that made from phenol and methylene-diphenyl-diamine and thoroughly impregnated therewith. After impregnation, they are cut or stamped into strips or pieces of the proper length and width and then bent or otherwise formed into suitable shape, whereupon they are hardened by heat. They may be hardened at temperatures running between 125° and 150° C. but in order to develop the desired properties, namely a permanent high coefficient of friction and a material which will not become glazed during use, they are subjected to a much higher temperature. The temperature is gradually increased to 250° to 275° C. where there is evolution of smoke and at about 325° to 350° C. the evolution of smoke ceases and all the volatile substances have been driven off. They may be subjected to still higher temperatures without damage, but the above mentioned temperatures are sufficient to develop the desired properties as the heat developed in actual service by friction seldom reaches such temperatures.

To produce thick and heavy brake blocks for railroad cars or other heavy vehicles, or machinery, my friction compound may be compounded with asbestos and steel filings or better still, steel wool in the proportions of about 60 to 75% asbestos and from 40 to 25% steel wool and then formed into brake blocks; or the blocks may be first formed from asbestos fiber and steel wool with one of the ordinary binders as used in paper making, and then after the object is dried it is impregnated with my friction compound. Again the blocks may be composed of layers previously impregnated, which are cemented together. No matter how the blocks are formed they are hardened by heat at ordinary atmospheric pressure, although in the last mentioned case a slight pressure may be of advantage to more thoroughly join the cemented layers together. Additional pressure is unnecessary in the heat hardening of my material as it may be hardened at atmospheric pressure without swelling, blistering or becoming porous. When pressure is used it forms a glassy shell on the surface which is hard and very brittle. Apparently when my material is heat hardened under pressure, the escape of volatile substances is prevented and the impregnating composition seems to be driven more to the surface, forming the above mentioned hard brittle shell, whereas the interior remains softer and less compact.

This hard outer shell is disadvantageous and it is therefore preferable to heat harden at atmospheric pressure.

In order to increase the wearing qualities of heavy brake-shoes and to distribute the heat developed by friction more uniformly throughout the whole mass, the asbestos is preferably combined with from 25 to 40% of some metal which may be in the granular or powdered form or better, in the form of steel wool or very fine short wire. I find steel wool suitable for this purpose. My brake-shoes or linings are well adapted for use in connection with railroad cars or other vehicles or other machinery, and are efficient under heavy wearing strains. They are of compact and dense texture and are unaffected by water, oil and heat and have a very high temperature of carbonization. They grind much less than do the metal shoes and so prolong the life of the parts. They will however, cause either a fast or slowly moving vehicle to come smoothly to a stop in extremely short time.

Referring to the drawings:

Figure 1 is a perspective view of a brake-shoe.

Figure 2 a side elevation thereof, partly in section.

Figure 3 is a side elevation partly in section of a modification.

Figure 4 is a perspective view of a brake-band and

Figure 5 is a perspective view of a sectional brake-band.

The brake-shoe 1 is composed of a number of similar layers 2 of asbestos fiber impregnated with my condensation product. The usual holes 3 are provided for the purpose of attaching the block in the usual manner.

In the modification illustrated in Figure 3, the block consists of a homogeneous mass instead of a series of layers. The numeral 5 designates a brake-band which encircles the drum and the numeral 6 designates sections of a similar brake-band mounted upon a supporting strap 7. In the case of bands having a smaller diameter, sometimes it is very inconvenient to place same in the drilling machine to bore holes therein. When this is the case, the band 5 may be made up of the sections 6.

I claim:—

1. A brake friction member comprising asbestos impregnated with a condensation product of phenol and methylene-diphenyl-diamine.

2. The process of making a brake friction member which comprises impregnating asbestos with a condensation product of phenol and methylene-diphenyl-diamine and heating gradually to about 350° C.

3. A process of making a brake friction member comprising heating a mixture of asbestos and a condensation product of phenol and methylene-diphenyl-diamine to about 350° C. at atmospheric pressure.

4. A brake friction member comprising asbestos and metal impregnated with a condensation product of phenol and methylene-diphenyl-diamine.

WILLIAM ACHTMEYER.